Aug. 8, 1933.  B. A. WITTKUHNS  1,921,983
FOLLOW-UP DEVICE FOR GYRO COMPASSES
Filed Nov. 4, 1930  2 Sheets-Sheet 1

INVENTOR
BRUNO A. WITTKUHNS
BY
ATTORNEY.

Patented Aug. 8, 1933

1,921,983

UNITED STATES PATENT OFFICE 1,921,983

FOLLOW-UP DEVICE FOR GYRO COMPASSES

Bruno A. Wittkuhns, Chatham, N. J., assignor to Sperry Gyroscope Company, Inc., Brooklyn, N. Y., a Corporation of New York Application November 4, 1930. Serial No. 493,342

11 Claims. (Cl. 172—239)

This invention relates to electrical follow-up for remote control systems wherein the position of a sending instrument, such as the sensitive element of a gyroscopic compass, controls the position of a follow-up element or other receiving device. In substantially all follow-up systems there is a decided tendency for the follow-up element to "hunt" around its position of rest or coincidence with the position of the sensitive element, that is, to mechanically oscillate back and forward through a small arc across this position. Heretofore this hunting had been found desirable in gyroscopic compasses because it maintained the bearings and other parts "nascent", that is free from static friction. However, there are many objections to mechanical hunting because it sets up similar oscillations in the repeater compasses driven from the master compass rendering them difficult to read. According to my invention I propose to entirely eliminate this mechanical hunting which is usually of a magnitude of a degree or more and of a frequency on the order of 80 per minute, more or less. In its stead I propose to set up a minute vibration, oscillation, or tremor in the system, the magnitude of which is so small and its period so rapid as not to be transmitted to the repeater motors, but which is sufficient to keep the bearings and other parts nascent. Such oscillations or tremors, while they may be felt by the hand, have a frequency on the order of some six to ten times as great as the mechanical hunting and are of one sixth to one tenth the magnitude.

More particularly my invention constitutes an improvement in my prior follow-up system jointly invented with Frederic M. Watkins, Serial No. 381,660, filed July 27, 1929, and also my sole application, Serial No. 433,562 for Remote control systems, filed March 6, 1930.

Referring to the drawings in which two forms of the invention are shown,

Figure 1:
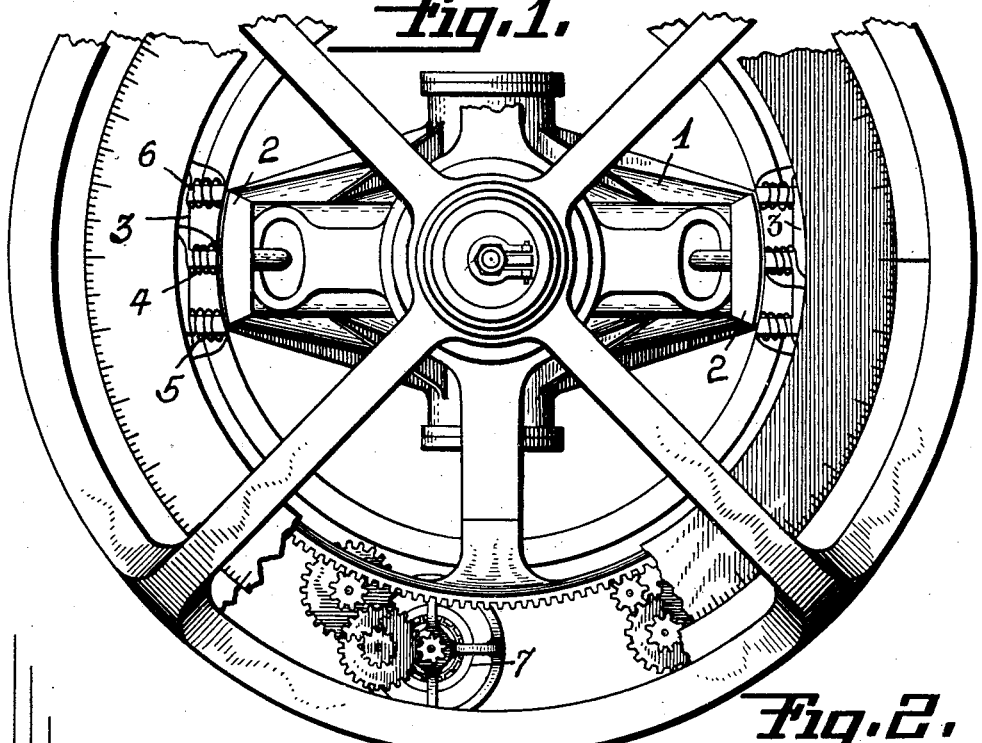
Fig. 1 is a plan view of a gyroscopic compass having my follow-up system thereon.

While my invention is illustrated as applied to the follow-up of a gyro compass, it will be understood that it is applicable to other follow-up and remote control systems. The sensitive element of the gyro compass is shown at 1 and on the sensitive element is mounted one part 2 of my two part controller. Preferably this part has no windings thereon and comprises a small piece of magnetic material, such as soft iron. The other part of the controller comprises a double transformer element 3, the central or primary winding 4 of which is supplied from an A. C. supply. The two outer secondary windings 5 and 6 are preferably placed on the outer legs of the transformer so that the part 2 completes the magnetic circuit between the several legs of the transformer and by relative movement of the two parts of the controller, the E. M. F. generated in the two coils 5 and 6 is differentially varied. The output of these coils is preferably cross-connected to an amplification system, the output of which drives, preferably in connection with the A. C. supply, the reversible follow-up motor 7, this system being generally described in the aforesaid application.

Such systems, however, as above stated, are subject to mechanical hunting which is difficult to control both as to magnitude and frequency and by this invention I have incorporated in this system certain novel circuits whereby mechanical hunting is practically eliminated and electrical tremors or vibrations substituted. In order to eliminate the mechanical hunting, I connect preferably between the output of the amplification system and the input thereto, a feed back transformer and variable resistance which is arranged to resist or oppose mechanical resonance between the motor torques and the inertia of the driven parts or follow-up element, which resonance is largely the cause of hunting.

Figure 3:
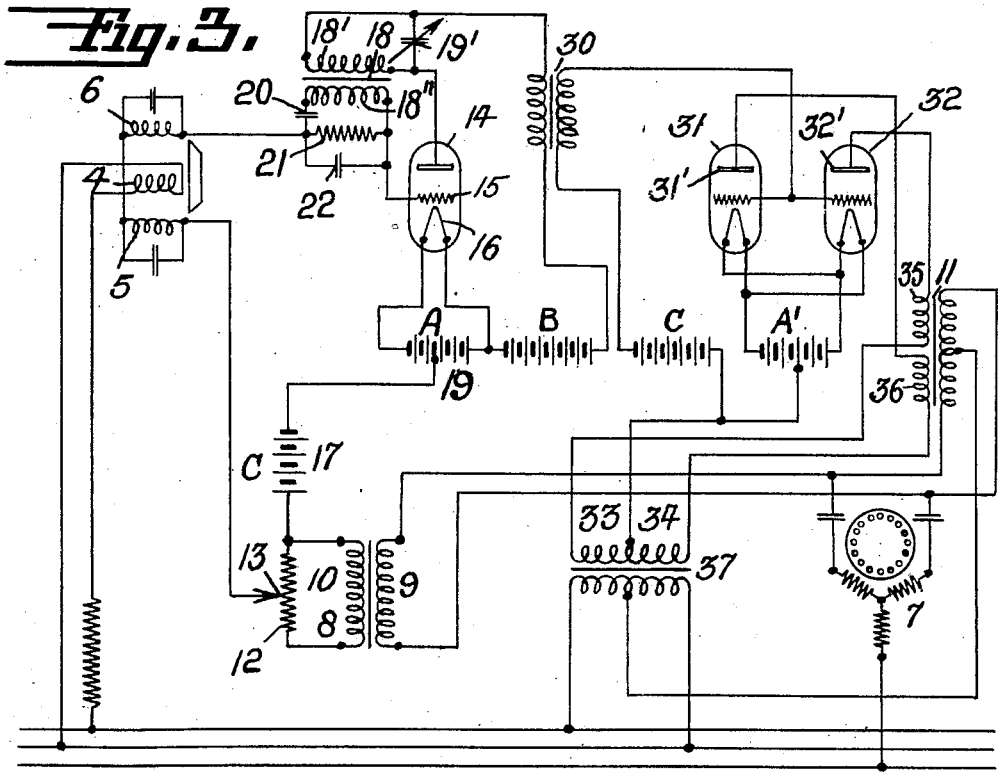
Fig. 3 is a simplified wiring diagram showing particularly my special means for eliminating mechanical hunt and for producing the electrical tremor in connection with a simpler circuit than Fig. 2, some of the feed back circuits being omitted.

Referring first to Fig. 3 wherein the circuits are simplified to clarify the explanation, the differential output of the transformers 5 and 6 is led to the grid 15 of the first tube 14. The output plate circuit of said tube is shown as coupled through transformer 30 to a pair of push-pull power-amplifying tubes 31 and 32, the transformer being coupled in parallel to the grids of both tubes. The plate circuits of said tubes are energized from the A. C. supply source through suitable secondary windings 33 and 34 of transformer 37, the connections being such that their voltages are opposite in direction so that at any given instant the plates of tubes 31 and 32 have opposite polarities. One coil 35 of output transformer 11 is connected to plate 32' and an opposing coil 36 to plate 31'. A Scott connection is shown between transformers 11 and 37 for obtaining the proper phase relations to give, in connection with one phase of the supply, three phase reversible operation for motor 7 dependent on the direction of relative movement of controller core 2. In other words, two of the phases of the motor 7 are reversed whenever the armature 2 moves from one side to the other of its central position with respect to the windings 5—6, thus causing the motor 7 to drive the follow-up system and compass card 3 which carries the coils 5—6 in the proper direction to restore synchronism between the sensitive and the follow-up systems. My hunt preventing means is shown generally at 8, it comprising inductively coupled coils 9 and 10, coil 9 being connected to the output side of the output transformer 11 of the amplification system, or in other words, it is connected in parallel with the input to the two reversible phases of the motor 7. The secondary coil 10, on the other hand, has connected across the terminals thereof a resistance 12 having a variable tap 13 therein which is connected in some manner to serve as a feed-back to the grid of the first thermionic tube 14. As shown the tap is led to one of the coils 5 which in turn is connected to the grid 15. There is also formed through the tap 13 a return connection between the grid 15 and the filament 16 through the "C" battery 17 and the mid point of "A" battery 19. The above described hunt preventing means seems to act as an out of phase feed back coupling which bucks or resists a continuous reversal of the motor, preventing hunting by opposing the mechanical resonance between the motor torque and the inertia of the driven parts, the operator adjusting the connection 13 until the hunting is reduced or entirely eliminated by varying that part of the potential drop across the potentiometer 12 which is applied to the grid.

In order to maintain the bearings and other parts nascent, however, I reintroduce a substitute for the mechanical hunting which does not possess the objectionable features thereof. This is in the form of what may be termed an electrical oscillation causing a mechanical tremor of the motor armature and follow-up system, the magnitude of which is so small as not to be transmitted, as it is taken up in the lost motion in the gearing. It is also very much faster than the mechanical hunt. For the above purpose I may employ another feed back arrangement preferably between the plate of the first tube 14 and the input to the grid thereof. This device is shown as comprising a transformer 18 and a variable condenser or condensers 19' connected across coil 18' of the transformer. This closed circuit, therefore, including the coil 18' and variable condenser 19', forms an oscillatory circuit which may be tuned to the desired frequency. Coil 18'' of the transformer is coupled in some manner to the grid 15.

As shown in Fig. 3 it is connected across a resistance 21 placed between the output of the coils 4 and 5 and the grid 15, a series condenser 20 being placed between coil 18'' and resistance 21, and a second condenser 22 in parallel with resistance 21. The oscillatory circuit 18'—19' is tuned to a low audio or sub audio frequency which is very high, of course, as compared to the frequency of the mechanical hunt, and is of the proper frequency to give the motor armature an appreciable tremor but not sufficient to disturb the transmitting system from the compass. This tremor frequency is present under all conditions and is actually superimposed on the output of the control transformer 5, 6 and it does in no way interfere with any impulse transmitted. The tremor is amplified together with any impulse in the push-pull power stage and from there it goes into the motor. A part of the tremor frequency is fed back again through the hunt-suppressor device, but due to the difference in frequency of mechanical hunt and electrical oscillations, no interference is produced.

Figure 2:
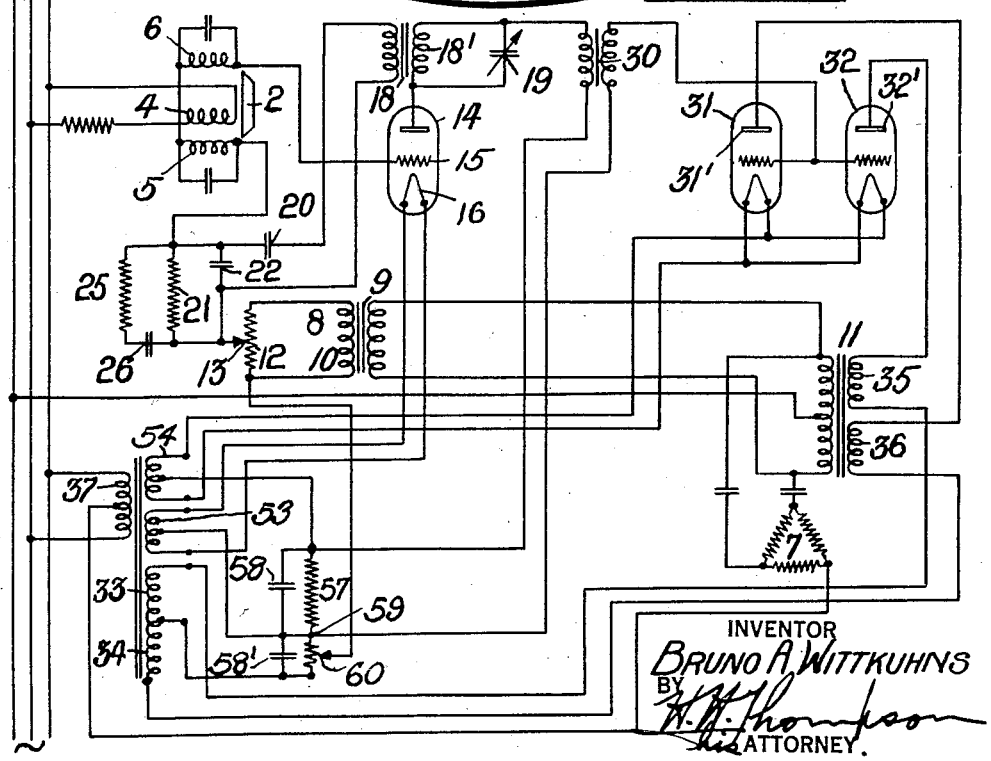
Fig. 2 is a wiring diagram of the preferred form of my invention.

It should be understood that Fig. 3 represents an elementary wiring diagram only and that my preferred form of the invention is shown in Fig. 2, wherein the supply furnished by the A, B and C batteries of Fig. 3 is all taken from the main A. C. supply, no other source of current being necessary. Thus, in addition to the windings 33 and 34 on transformer 37 there is also a heater winding 53 for filament 16 of the first tube and another auxiliary winding 54 to heat the filaments of the push-pull amplifier tubes 31—32, both windings having center taps. The output of the first tube passes through the inter-stage transformer 30 and thence to the grids of the amplifier tubes 31—32 as in Fig. 3. I also employ a variable resistor 57 connected between the mid point of the winding 54 and the mid point between windings 33 and 34 or in other words, in series with the tubes 31—32. On account of the rectifying action of the push-pull tubes acting as a full wave rectifier, the current flowing through the resistor will be a pulsating direct current which may be smoothed out by condensers 58—58' in a well known manner. I also connect to the resistor, preferably at intermediate point 59, the mid point of winding 53. The resistor 57 thus completes a circuit to the first tube as well as the others, and by connecting the grid of the first tube to an intermediate point 60 on the resistor the negative grid bias for this tube may be obtained. Also the proper D. C. positive plate potential is obtained from the same resistor by connecting the same through transformer 30 to the plate of the first tube. The grid bias for tubes 31—32 is also obtained from said resistor by connecting the grids thereof to an intermediate point, such as 59. The final output of the tubes is led through the output transformer 11 as in Fig. 3, the action being the same as previously explained. The parts are correspondingly numbered in Fig. 2 so that the hunt suppressing feed-back system 8 and the tremor producing feed-back system 18—19 will be readily recognized. It should also be noted that in Fig. 2 there is shown an additional resistor 25. This has preferably a very high resistance of more than 100,000 ohms and serves to maintain correct phase relation in the tremor feed back in connection with the additional condenser 26, which is not shown in Fig. 3 but which I consider an important adjunct to my invention. It is, of course, immaterial whether the feed-backs are connected directly to the grid or through the control as long as their impulses reach the grid. In Fig. 3 I have shown the hunt-preventing feed-back connected through the controller and the tremor-producing feed-back connected to the grid. In Fig. 2, however, both feed-back systems are shown connected through the controller.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. It will be obvious, of course, to those versed in the art of oscillatory circuits and feed-back arrangements, that any feasible feedback means may be used to obtain similar results both in the hunt preventing and tremor producing features. Instead of using close coupled coils to influence the grid circuit, capacity or resistance feed back may be used, or any other suitable combination of inductive, capacitive or resistive feed back or components thereof might be employed within the spirit of the appended claims. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An electrical follow-up system wherein a two-part controller is mounted on the sensitive and follow-up elements and wherein relative movement between such parts in one direction or the other creates an output of substantially opposite characteristics, a thermionic valve system for amplifying such output, a motor controlled from the output of said amplifying system, and a feed-back circuit responsive to the input to said motor for impressing on the input to said amplifying system a stabilizing E. M. F. opposing slow period surges which otherwise cause hunting.

2. An electrical non-contacting, thermionic follow-up system for gyroscopic compasses and the like having a controlling and a follow-up element, characterized by the provision of feedback means for preventing the usual mechanical hunt of the follow-up element, and means for replacing said hunt by setting up a low amplitude low frequency tremor.

3. In a follow-up system for sensitive instruments, having a sensitive and a follow-up element, of a thermionic amplifying system having an alternating current supply, means controlled by relative movement of the sensitive and follow-up elements for governing the input to said system, a motor governed by the output of said thermionic system, and a feed back means in said system for preventing mechanical hunting of the said motor.

4. In a follow-up system for sensitive instruments having a sensitive and follow-up element, of a thermionic amplifying system having an alternating current supply, means controlled by relative movement of the sensitive and follow-up elements for governing the input to said system, a motor governed by the output of said thermionic system, and a feed back means connected between the input to said motor and the grid of the first tube which is out of phase with the natural surges of the system and opposes hunting of the motor.

5. An electrical follow-up system wherein a two-part controller is mounted on the sensitive and follow-up elements and wherein relative movement between such parts in one direction or the other creates an output of opposite characteristics, a thermionic valve system for amplifying such output, a motor controlled from the output of said amplifying system, and electrical means for setting up in said thermionic valve system an oscillation of the proper frequency to set up tremors of small amplitude in said motor and follow-up system.

6. In a follow-up system for gyroscopes and the like, the combination with the reversible follow-up motor and a thermionic amplification system for controlling the same, of an oscillatory circuit associated therewith for producing low amplitude, low frequency tremors in said motor for the purpose specified.

7. In a follow-up system for gyroscopes and the like, the combination with the reversible follow-up motor and a thermionic amplification system for controlling the same, of low or sub-audio frequency generated in the output of the first tube of the system and introduced into the input thereto for producing tremors in said motor.

8. In a follow-up system for gyroscopes and the like having sensitive and follow-up elements, a two-part controller mounted on said sensitive and follow-up elements wherein relative movement between such elements in one direction or the other creates an output of opposite phase from said controller, a thermionic valve system for amplifying such output, a motor controlled from such output, and electrical means in said system for substituting for the natural mechanical hunting of said motor a tremor of small amplitude.

9. In a remote control system for reversible motors, a polyphase supply, a controller excited from a phase thereof, a thermionic amplifying system connected thereto, a multi-wound transformer powered from said supply for supplying filament, plate and grid potentials thereto, a motor driven by the output of said amplifying system, and an oscillatory transformer connected between the output of the system and the input to maintain electrical oscillations or tremors in said motor.

10. In a remote control system for reversible motors, a polyphase supply, a controller excited from a phase thereof, a thermionic amplifying system connected thereto, a multi-wound transformer powered from said supply for supplying filament, plate and grid potentials thereto, said circuit having feed-back characteristics, a feed-back or bucking transformer, condenser and resistance in the output of the system, a motor driven by the output of said amplifying system, and means for varying said transformer and resistance to prevent mechanical hunting of said motor and substitute therefor electrical oscillations causing tremors in said motor.

11. In a reversible follow-up or remote control system, the combination with an alternating current supply and a reversible motor driven therefrom, a controller, a thermionic amplification circuit actuated therefrom and powered from said supply for driving said motor in either direction, said circuit containing a feed back circuit having a phase-shifting device therein to substantially prevent mechanical hunting of said motor, and means for adjusting said device for minimum hunt.

BRUNO A. WITTKUHNS.